United States Patent [19]
Lee

[11] Patent Number: 5,946,064
[45] Date of Patent: Aug. 31, 1999

[54] ALIGNMENT LAYER, METHOD FOR FORMING ALIGNMENT LAYER AND LCD HAVING THE SAME

[75] Inventor: Eung-sang Lee, Pusan, Rep. of Korea

[73] Assignee: Samsung Display Devices Co., Ltd., Kyungki-do, Rep. of Korea

[21] Appl. No.: 08/998,480

[22] Filed: Dec. 29, 1997

[30] Foreign Application Priority Data

Dec. 30, 1996 [KR] Rep. of Korea ................... 96-76942

[51] Int. Cl.[6] .................... G02F 1/1335; G02F 1/337; G02F 1/141
[52] U.S. Cl. .................... 349/124; 252/299; 349/135; 349/10
[58] Field of Search ................... 349/10, 124, 135, 349/299

[56] References Cited

U.S. PATENT DOCUMENTS

| | | | |
|---|---|---|---|
| 5,371,717 | 12/1994 | Boloeforosh | 367/140 |
| 5,689,320 | 11/1997 | Okada et al. | 349/135 |
| 5,691,792 | 11/1997 | Mizushima et al. | 349/124 |
| 5,754,260 | 5/1998 | Ooi et al. | 349/10 |
| 5,866,034 | 2/1999 | Han | 252/299 |

*Primary Examiner*—William L. Sikes
*Assistant Examiner*—Julie Ngo
*Attorney, Agent, or Firm*—Lowe Hauptman Gopstein Gilman & Berner

[57] ABSTRACT

An alignment layer, a method for forming the alignment layer, and a liquid crystal display (LCD) adopting the alignment layer are provided. The alignment layer includes a heat-curable resin layer having microgrooves and an optical alignment polymer layer, coated on the heat-curable resin layer. According to the present invention, the thermal stability of the alignment layer is improved. Accordingly, an LCD adopting the alignment layer has improved display performance.

12 Claims, 1 Drawing Sheet

ALIGNMENT LAYER, METHOD FOR FORMING ALIGNMENT LAYER AND LCD HAVING THE SAME

BACKGROUND OF THE INVENTION

The present invention relates to a liquid crystal display (LCD) adopting the alignment layer, and more particularly, to an alignment layer having an excellent alignment property and excellent thermal stability, a method for forming the same and a LCD having the alignment layer.

Generally, a liquid crystal has both the fluidity characteristic of a liquid and the optical property of a crystal, and an optical anisotropic property thereof changes by an electrical field or heat. An LCD is a display device using such properties of the liquid crystal.

FIG. 1 is a sectional view showing the structure of a general LCD.

Referring to FIG. 1, transparent electrodes 13 and 13' are formed on upper and lower transparent substrates 12 and 12', respectively, and insulation layers 14 and 14' and alignment layers 15 and 15' are formed on the transparent electrodes 13 and 13', respectively.

Also, Spacers 16 are distributed between the upper transparent electrode 12 and the lower transparent electrode 12' to maintain a cell gap of a predetermined distance, and a liquid crystal layer 17 is formed in the cell gap.

Polarization plates 11 and 11' for polarizing incident light are formed at the outer surfaces of the substrates 12 and 12', respectively.

In the LCD having the above structure, performances such as light transmittance, response time, viewing angle and contrast are determined according to the alignment properties of the liquid crystals. Thus, it is very important to evenly control the alignment of the liquid crystals.

It is difficult to attain uniform alignment of the liquid crystals by simply interposing the liquid crystal layer between the upper and lower substrates. Accordingly, the alignment layers 15 and 15' are formed on the transparent electrodes 12 and 12' as shown in FIG. 1.

The alignment layer is mainly formed by forming a thin film of organic polymer such as polyimide and polyamide on the substrate, curing the thin film, and then rubbing the resultant using a rubbing cloth.

The above method for forming the alignment layer is easy and simple. However, the alignment layer may be contaminated by fine particles or fibers of the cloth used for the rubbing process. Also, insufficient alignment may be resulted according to the material of the alignment layer, and a thin film transistor (TFT) may be damaged by static electricity generated during the rubbing process.

In order to solve the above problems, an optical alignment method which does not cause dust or static electricity has been developed. According to such a non-destructive alignment method, polarized light is irradiated onto the optical alignment layer to cause anisotropic photopolymerization. As a result, the optical alignment layer has alignment characteristic, thereby uniformly aligning the liquid crystals. The polymer for the optical alignment layer includes polyvinylcinnamate (PVCN) and polyvinylmethoxyxinnamate (PVMC). However, such polymers have poor thermal stability, although they have an excellent optical alignment property. In other words, the thermal stability of an alignment layer depends upon that of the polymer, which depends upon a glass transition point and cross linking density. Since the polycinnamate generally has a glass transition point of 100° C. or below and is difficult to subject to a photo-reaction of 50% or more in a solid state, increasing the cross linking density is limited, which weakens the thermal stability of the alignment layer.

SUMMARY OF THE INVENTION

To solve the above problems, it is an object of the present invention to provide an alignment layer having excellent thermal stability.

It is another object of the present invention to provide a method for forming the alignment layer.

It is still another object of the present invention to provide a liquid crystal display (LCD) adopting the alignment layer.

To achieve the first object, there is provided an alignment layer comprising:

a heat-curable resin layer having microgrooves: and an optical alignment polymer layer coated on the heat-curable resin layer To achieve the second object, there is provided a method for forming an alignment layer comprising the steps of:

(a) forming a heat-curable resin layer on a substrate having electrodes;

(b) forming microgrooves on the surface of the heat-curable resin layer; and (c) coating a polymer having an optical alignment property on the heat-curable resin layer having the microgrooves and irradiating ultraviolet rays on the resultant structure.

To achieve the third object, there is provided a liquid display comprising upper and lower substrates, transparent electrodes formed on the upper and lower substrates, optical alignments formed on the transparent electrodes, wherein the optical alignment is a bilayered structure of a heat-curable resin layer and an optical alignment polymer layer.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

According to an a embodiment of the present invention, the optical alignment layer has a bilayered structure of a heat-curable resin layer having microgrooves and an optical alignment polymer layer. As a result, a thermal stability of the alignment layer and the alignment stability are greatly improved. Here, it is preferable to control the alignment direction of the alignment layer due to the microgrooves to be coincided with that of the alignment layer due to irradiation of light.

Figure 1:
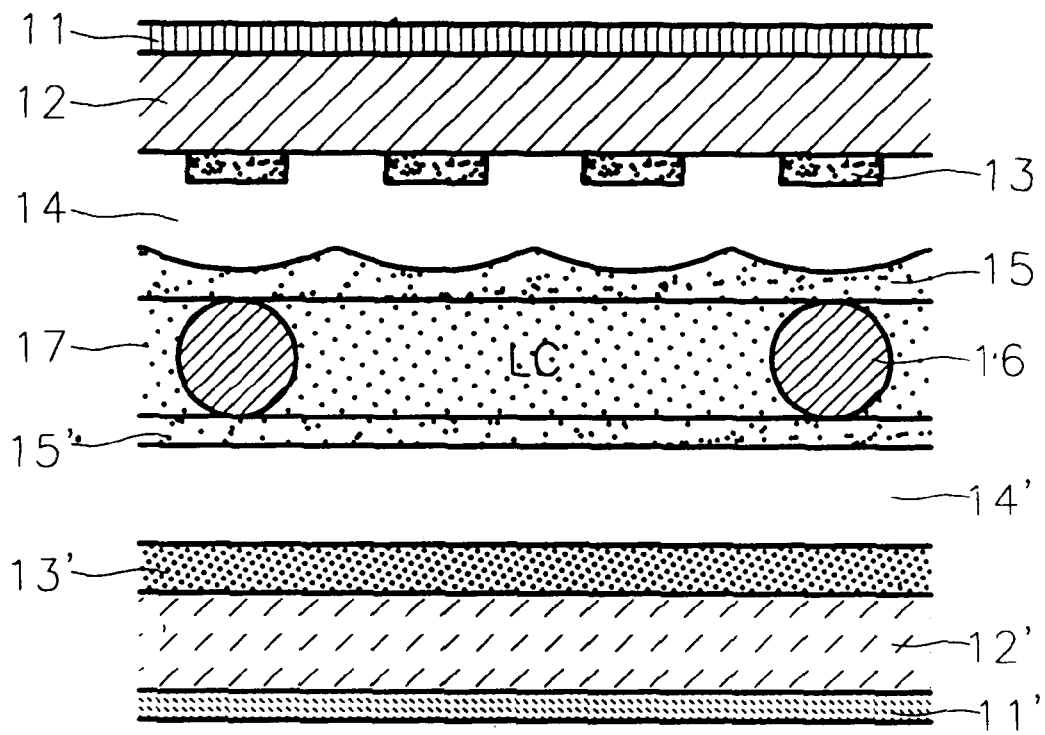
FIG. 1 is a sectional view of a general liquid crystal display (LCD)
Figure 2:
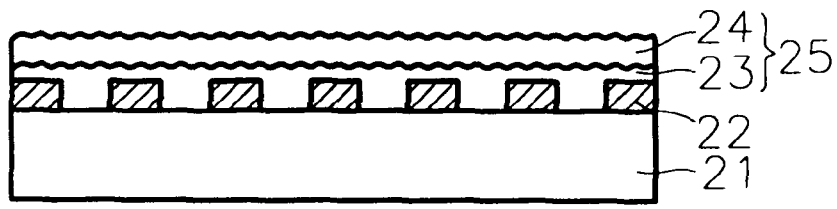
FIG. 2 is a sectional view showing the structure of an alignment layer of an LCD according to an a embodiment of the present invention.

Hereinafter, referring to FIG. 2, an alignment layer, a method for forming the alignment layer and an LCD adopting the alignment layer will be described.

First, a heat-curable resin layer 23 is formed on a glass substrate 21 having an indium tin oxide (ITO) electrode 22. Any heat-curable resin, particularly, epoxy resin, may be used as the material for the thermo-curable layer.

Then, microgrooves are formed on the surface of the heat-curable resin layer 23. In order to form microgrooves in the heat-curable resin layer, a general microgroove forming method may be used. In the present invention, a pressing method is used.

Preferably, the depth of the microgrooves is 100~500 Å, and the width of one microgroove in the microgrooves is 1,000~10,000 Å. When the microgrooves have the above depth and width, the alignment property of the liquid crystals is at its best.

An optical alignment polymer is coated on the heat-curable resin layer 23 and then dried to form an optical alignment polymer layer 24, thereby completing a bilayered structure of an optical alignment layer 25. Here, there is no restriction on the material that can be used for forming the optical alignment polymer layer.

Then, a linear polarized light of 300~400 nm is irradiated to the optical alignment layer for a photoreaction, and then two substrates are joined together while maintaining a predetermined gap therebetween using a spacer, resulting in an empty cell between two substrate. Then, liquid crystals are injected into the empty cell to complete the LCD.

Hereinafter, the present invention will be described with reference to the following examples, however, the present invention is not limited to the examples.

EXAMPLE

ITO electrodes were formed on two clean glass substrates, respectively, and then the resultant substrates were coated with epoxy resin to form a epoxy resin layer. After drying the epoxy resin layer, a pressing process was performed on the resultant structure using a mold having microgrooves. Then, a thermal process was performed on the resultant at 150° C. for 1 hour to transfer the shape of the mold having the microgrooves to the epoxy resin layer.

Then, 0.2 g of polyvinylcinnamate (Aldrich Co.) was dissolved in 10 g of N-methyl 2-pyrrolidone (NMP) to produce a composition, and then the composition was spin-coated on the epoxy resin layer having the microgrooves. Then, the resultant structure was dried at about 100° C. for 1 hour, to form a optical alignment polymer, thereby completing an alignment layer.

Then, a linear polarized light of about 313 nm was irradiated onto the alignment layer using a high-pressure mercury lamp having a light intensity of about 10 mw/cm$^2$ for about 5 minutes.

While maintaining a predetermined interval between two glass substrates each having the alignment layer using a spacer, two glass substrates were joined together, forming an empty cell between two substrates. Then, liquid crystals were injected into the empty cell and then a thermal process was performed at 100° C. for 25 minutes, thereby completing the LCD.

Comparative Example 1

An LCD was manufactured by the same method as Example 1, except the microgrooves were not formed on the epoxy resin layer.

Comparative Example 2

After forming an ITO electrode in two clean glass substrates, respectively, polyimide (RN715, Ilsan Chemical Co.) was coated on the substrates. Then, a thermal process was performed at 220° C. for about 1 hour, resulting in a polyimide layer serving as an alignment layer.

Then, the polyimide layer was rubbed with a cloth, and then two glass substrates were joined together while maintaining a predetermined interval between two glass substrates each having an a polyimide layer, producing an empty cell between two substrates. Then, liquid crystals were injected into the empty cell and then a thermal process was performed at about 100° C. for about 25 minutes, completing the LCD.

With respect to the LCDs manufactured by the Example and Comparative Examples 1 and 2, the degree of alignment of the alignment layer and a thermal stability of the alignment layer were measured. For measuring the thermal stability of the alignment layer, the LCD was left for a predetermined duration at about 200° C. and then at room temperature sequentially. Then, the deformation degree of the alignment layer was visually observed using a polarization film. Also, the degree of alignment was visually checked using the polarization film.

As a result, the LCD manufactured by the Example had is, excellent alignment properties, and the alignment state of the alignment layer was maintained without changes even though the temperature was increased to 200° C. That is, the thermal stability of the alignment layer was excellent. Also, the liquid crystals were aligned using light, so that the alignment layer was prevented from being contaminated.

On the contrary, in the LCDs of the Comparative Examples, the alignment property was excellent, however, the thermal stability of the alignment layer decreased so that the alignment state of the alignment layer changed at 100° C. In particular, in the case of Comparative Example 2, the alignment layer was contaminated by much dust and static electricity generated during the rubbing process.

As described above, the alignment layer formed by the present invention has excellent thermal stability. Thus, an LCD having improved display performance can be obtained.

What is claimed is:

1. An alignment layer comprising:
    a heat-curable resin layer having microgrooves: and
    an optical alignment polymer layer coated on the heat-curable resin layer.

2. An alignment layer as claimed in claim 1, wherein the heat-curable resin layer is formed of epoxy resin.

3. An alignment layer as claimed in claim 1, wherein the depth of one microgroove in the microgrooves is 100~500 Å.

4. An alignment layer as claimed in claim 1, wherein the width of one microgroove in the microgrooves is 1,000~10,000 Å.

5. A method for forming an alignment layer comprising the steps of:
    (a) forming a heat-curable resin layer on a substrate having electrodes;
    (b) forming microgrooves on the surface of the heat-curable resin layer; and
    (c) coating a polymer having an optical alignment property on the heat-curable resin layer having the microgrooves and irradiating ultraviolet rays on the resultant structure.

6. A method for forming an alignment layer as claimed in claim 5, wherein the heat-curable epoxy resin layer is formed of epoxy resin.

7. A method for forming an alignment layer as claimed in claim 5, wherein the depth of the microgrooves is 100~500 Å.

8. A method for forming an alignment layer as claimed in claim 5, wherein the width of the microgrooves is 1,000~10,000 Å.

9. A liquid display comprising upper and lower substrates, transparent electrodes formed on the upper and lower substrates, optical alignments formed on the transparent electrodes, wherein the optical alignment is a bilayered structure of a heat-curable resin layer and an optical alignment polymer layer.

10. A liquid crystal display as claimed in claim 9, wherein the heat-curable resin layer is formed of epoxy resin.

11. A liquid crystal display as claimed in claim 9, wherein the depth of one microgroove in the microgrooves is 100~500 Å.

12. A liquid crystal display as claimed in claim 9, wherein the width of one microgroove in the microgrooves is 1,000~10,000 Å.

* * * * *